Sept. 6, 1932. T. R. WHITE 1,875,686
SAFETY HAND BRAKE LOCKING DEVICE FOR AUTOMOBILES AND TRUCKS
Filed Oct. 21, 1930
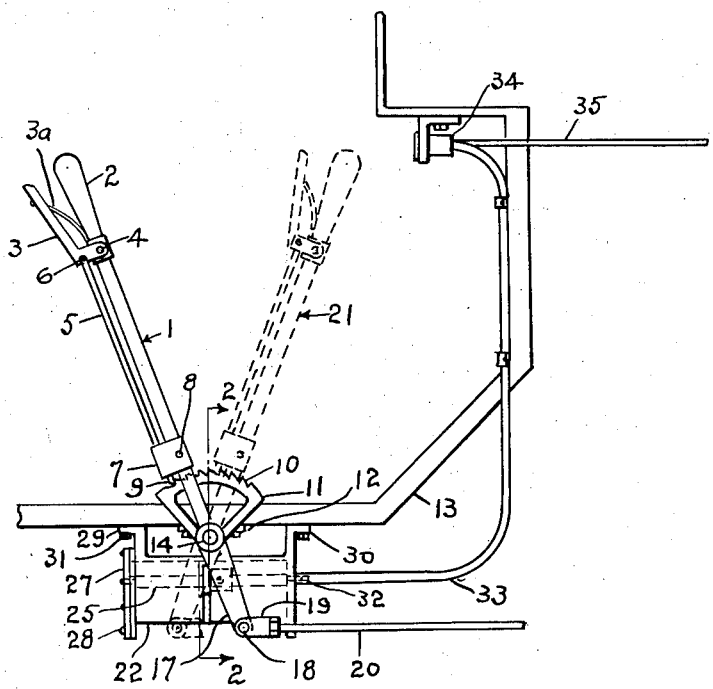
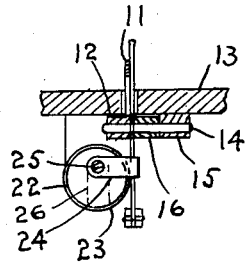
Fig.2.
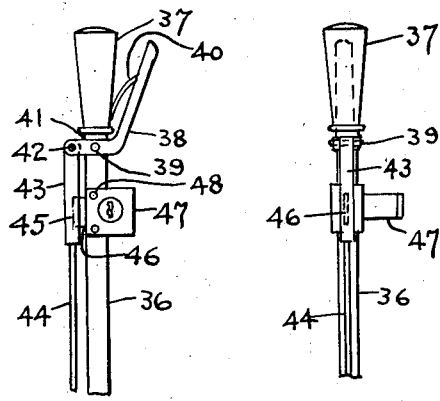
Fig.3. Fig.4.
Theodore R.White
INVENTOR.
BY
Charles A. Clark
ATTORNEY.

Patented Sept. 6, 1932

1,875,686

UNITED STATES PATENT OFFICE

THEODORE R. WHITE, OF BROOKLYN, NEW YORK

SAFETY HAND BRAKE LOCKING DEVICE FOR AUTOMOBILES AND TRUCKS

Application filed October 21, 1930. Serial No. 490,149.

My invention relates to emergency brakes for automobiles and trucks and refers more particularly to a device for locking the emergency brake when the brake is set.

One object of my invention is to provide a locking device to prevent further movement of the emergency brake after the brake has been moved to the locking position.

Another object of my invention is to provide a locking device for the emergency brake of an automotive vehicle that is operated by a means connected to the ignition switch so that the ignition may be locked and the emergency brake locked simultaneously.

A further object of my invention is to provide a lock attachable to an emergency switch handle that is adapted to prevent the locking ratchet of the emergency switch from being moved when the device is in the locked position.

A still further object of my invention is to provide a means for locking the emergency brake of an automotive vehicle so that the brake cannot be released until it has been unlocked at a point remote from the device, thereby providing means for preventing any tampering with the emergency brake and to positively prevent the brake from jarring loose after it has once been moved to the braking position.

I attain these objects preferably by the means illustrated in the accompanying drawing, wherein similar numerals refer to like parts throughout the several views, in which:—

Figure 1 is a side elevation of the emergency brake locking device.

Figure 2 is a section taken on line 2—2 of Figure 1.

Figure 3 is a partial side elevation of an emergency brake handle wherein the locking means is attached to the body near the handle portion.

Figure 4 is an end elevation of Figure 3.

The device shown in Figures 1 and 2 is comprised of a brake lever 1, provided with a handle 2, and adjacent to this handle there is a hand lever 3, pivoted at 4 to a link 5, and this lever 3 is maintained in the position shown in Figure 1, by means of the spring 3a, and this link 5 is attached to the lever 3 at 6 and passes through the guide 7, which is fixed to the handle 2 by means of the pin 8.

The end of this link 5 is bevelled at 9, as shown in Figure 1, and this portion is adapted to fit into the notches 10 in the segment 11, which is a part of the casting 12 that is attached to the floor 13 of the automotive vehicle.

This segment 11 is a part of the casting 12, which casting also provides one bearing for the shaft 14, the other bearing 15 being spaced therefrom.

The lever 1 is provided with a boss 16, integral therewith, and the shaft 14 passes through this boss and provides a pivot for the arm 1.

There is an extension 17 to this arm 1, the end of which is pivoted by the pivot 18 to a link 19, which carries a rod 20, leading to the emergency brake proper, and this brake is shown in the inoperative position by the dotted lines 21.

Under the floor 13 of the automobile there is arranged a cylinder 22, that is provided with a slot 23, through which the arm 24 is movable.

This arm 24 is connected to the shaft 25, which is eccentrically arranged within the cylinder 22, so that when the shaft is moved, this arm 24 will be positioned as shown by the solid line 24, and the dotted line 26 in Figure 2.

In order to erect the shaft of this cylinder 22, the end or cap 27 is detachably held to the cylinder body by means of bolts like 28 and to hold the cylinder to the floor 13, there are two lugs 29 and 30 attached to the cylinder 22, so as to provide means for holding the cylinder positioned by bolts like 31.

To the end of this shaft 25, there is pinned by the pin 32, a flexible shaft 33, within a suitably arranged tube and this shaft is connected to a standard barrel lock 34, which lock is also connected to the ignition cut off rod 35, so that when the lock is operated, the ignition may be connected or disconnected, and the shaft 25 operated simultaneously.

Having thus illustrated and described the preferred embodiment of my invention, I do not wish to limit myself to the exact construction or arrangement of parts shown, since it is evident that modifications may be made therein, without departing from the spirit of the invention or scope of the claims.

I claim:—

1. In a motor vehicle, the combination with an emergency brake lever having an extension, said lever pivoted under the floor board of the vehicle, and a notched segment engageable with a hand lever rod mounted upon said brake lever, of a support fixed to said floor board pivotally carrying a shaft, said shaft having fixed thereto a lever adapted to be moved to engage with said extension and prevent further movement of the brake lever.

2. In a motor vehicle, the combination with an emergency brake lever having an extension, said lever pivoted under the floor board of the vehicle, and a notched segment engageable with a hand lever rod mounted on said lever, of a tubular support having a slot therein and provided with feet attachable to said floor board, said support eccentrically carrying a shaft, pivoted in the ends therein and having fixed thereto a lever adapted to be moved through said slot to engage with said brake lever and prevent further movement of the brake lever.

3. In a motor vehicle, the combination with an emergency brake lever having an extension, said lever pivotally arranged under the floor board of the vehicle, and a notched segment that is engageable with a sliding hand lever rod mounted upon said lever, of a tubular support with a slot in the side thereof and having feet attachable to said floor board, said support eccentrically carrying a shaft, pivoted therein and having fixed thereto a lever adapted to pass through said slot and engage with said extension to prevent further movement of the brake.

Signed at New York, county of New York, State of New York, September, 1930.

THEODORE R. WHITE.